(12) United States Patent
Narita (10) Patent No.: US 7,580,704 B2
(45) Date of Patent: Aug. 25, 2009

(54) COMMUNICATION SYSTEMS AND METHODS FOR SWITCHING COMMUNICATION SERVICES (75) Inventor: Tetsuya Narita, Tokyo (JP)

(73) Assignee: Sony Corporation, Tokyo (JP)

( * ) Notice: Subject to any disclaimer, the term of this patent is extended or adjusted under 35 U.S.C. 154(b) by 449 days.

(21) Appl. No.: 11/346,284

(22) Filed: Feb. 3, 2006

(65) Prior Publication Data

US 2006/0193457 A1 Aug. 31, 2006

(30) Foreign Application Priority Data

Feb. 28, 2005 (JP) ............................. 2005-053374

(51) Int. Cl.
H04M 3/42 (2006.01)
(52) U.S. Cl. .................. 455/416; 379/202.01
(58) Field of Classification Search .................. None
See application file for complete search history.

(56) References Cited

U.S. PATENT DOCUMENTS

2002/0118664 A1* 8/2002 Ishibashi et al. ............ 370/338
2006/0013195 A1* 1/2006 Son et al. .................... 370/352

FOREIGN PATENT DOCUMENTS

| JP | 7-177198 | 7/1995 |
| JP | 09-321806 | 12/1997 |
| JP | 11-234642 | 8/1999 |
| JP | 2000-112846 | 4/2000 |
| JP | 2003-309651 | 10/2003 |
| JP | 2004-104653 | 4/2004 |
| JP | 2005-277681 | 10/2005 |

* cited by examiner

Primary Examiner—Lester Kincaid
Assistant Examiner—Phuoc Doan
(74) Attorney, Agent, or Firm—Oblon, Spivak, McClelland, Maier & Neustadt, P.C.

(57) ABSTRACT

Provided is a communication system including a first, a second, a third, and a fourth apparatuses, in which the first and the second apparatuses communicate with each other over a first communication service, and the third and the fourth apparatuses communicate with each other over a second communication service. The first apparatus has a first communication means, a setup information obtaining means, and a first connection requesting means. The second apparatus has a second communication means, and a second connection requesting means. The third apparatus has a third communication means, and a setup information sending means. The fourth apparatus has a fourth communication means and a connection processing means.

16 Claims, 7 Drawing Sheets

COMMUNICATION SYSTEMS AND METHODS FOR SWITCHING COMMUNICATION SERVICES

CROSS REFERENCES TO RELATED APPLICATIONS

The present invention contains subject matter related to Japanese Patent Application JP 2005-053374 filed in the Japanese Patent Office on Feb. 28, 2005, the entire contents of which are incorporated herein by reference.

BACKGROUND OF THE INVENTION

1. Field of the Invention

The present invention relates to a communication system providing a plurality of different communication services and a method for switching the communication service in this system. More particularly, the present invention relates to a communication system allowing users to switch a communication service with simple operations and a method for switching the communication service.

2. Description of the Related Art

Along with a recent remarkable development in communication technologies, communication services such as, for example, an email service based on an IP (Internet Protocol) network, mobile phone apparatuses using radio communication, and so forth, have become essential not only in business but also in a user's daily life. Furthermore, services so-called an IP phone service and an IP mobile phone service, in which the IP network is utilized as a telephone circuit, have emerged recently. Moreover, a technology for carrying out a videophone service or a videoconference service through the IP network is put into practical use.

As described above, when various communication services are available to a user, the user appropriately selects the most suitable communication service to use. There may be an occasion when the user has to use another communication service, while using one. For example, the users, currently talking on the phone, may desire to continue their talk using a videoconference service instead of the telephony service currently in use.

On this account, some technologies for switching a connection from the in-use communication service to another are offered. For example, a technology for switching the in-use communication service to the most suitable media on the basis of a degree of communication activity, calculated from importance of received information and communication record for each communication partner, is suggested (see, for example, Japanese Unexamined Patent Application Publication No. 2000-112846, paragraph numbers [0054] to [0081] and FIG. 1). A technology to prevent the ongoing communication service from being switched to an unexpected communication media is also suggested. In this technology, a communication terminal station exclusively controls a request for switching a communication media sent from another communication terminal station independently and asynchronously (see, for example, Japanese Unexamined Patent Application Publication No. 1995-177198, paragraph numbers [0025] to [0028] and FIG. 6).

SUMMARY OF THE INVENTION

However, in order to switch a communication service in use to another, a connection procedure for a target communication service has to be executed from the first step. For example, when a user starts a videoconference while talking on the phone, the user has to perform operations such as an input operation of a destination address on an electronic conference terminal. Furthermore, if the user does not know the destination address, the user needs to input the address to an apparatus after obtaining it. Accordingly, the user has to perform an identical operation procedure regardless of whether talking on the phone. This makes the operation complicated, resulting in inconvenience of the user.

In the view of foregoing, embodiments of the present invention advantageously provide a communication system that allows users communicating with each other to switch to a different communication service with simple operations to continue the communication.

The embodiments of the present invention also advantageously provide the method for switching a communication service, with which users communicating with each other can switch to a different communication service with simple operations to continue the communication.

According to an embodiment of the present invention, provided is a communication system including a first, a second, a third, and a fourth apparatuses. The first and the second apparatuses communicate with each other over a first communication service, and the third and the fourth apparatuses communicate with each other over a second communication service. The first apparatus has a first communication means for communicating with the third apparatus, a setup information obtaining means for obtaining, from the third apparatus via the first communication means, a setup information used for achieving a connection to the third apparatus over the second communication service, and a first connection requesting means for sending a connection request accompanied by the setup information to the second apparatus over the first communication service so that the fourth apparatus is connected to the third apparatus over the second communication service. The second apparatus has a second communication means for communicating with the fourth apparatus, and a second connection requesting means for sending a connection request accompanied by the setup information, received over the first communication service, to the fourth apparatus via the second communication means so that the fourth apparatus is connected to the third apparatus over the second communication service using the setup information. The third apparatus has a third communication means for communicating with the first apparatus, and a setup information sending means for sending the setup information to the first apparatus via the third communication means in response to a request for obtaining the setup information from the first apparatus. The fourth apparatus has a fourth communication means for communicating with the second apparatus, and a connection processing means for connecting, upon receiving the connection request from the second apparatus via the fourth communication means, the fourth apparatus to the third apparatus over the second communication service using the received setup information.

In the foregoing communication system, the setup information sending means of the third apparatus sends the setup information, used for achieving a connection to the third apparatus over the second communication service, to the first apparatus via the third communication means, in response to the request for obtaining the setup information from the first apparatus, when, for example, the first and the second apparatuses are communicating with each other over the first communication service. The setup information obtaining means of the first apparatus obtains the setup information from the third apparatus. The first connection requesting means of the first apparatus then sends a connection request accompanied by the obtained setup information to the second apparatus over the first communication service so that the fourth apparatus is connected to the third apparatus over the second communication service. The second connection requesting means of the second apparatus sends a connection request accompanied by the setup information, received from the first apparatus, to the fourth apparatus via the second communication means so that the fourth apparatus is connected to the third apparatus over the second communication service using the setup information. The connection processing means of the fourth apparatus connects the fourth apparatus to the third apparatus over the second communication service using the received setup information, upon receiving the connection request from the second apparatus.

According to another embodiment of the present invention, is provided a communication system including a first, a second, a third, and a fourth apparatuses. The first and the second apparatuses communicate with each other over a first communication service, and the third and the fourth apparatuses communicating with each other over a second service. The first apparatus has a first communication means for communicating with the third apparatus, a setup information requesting means for requesting, over the first communication service, the second apparatus to provide a setup information used for achieving a connection to the fourth apparatus over the second communication service, a first setup information obtaining means for obtaining the setup information from the second apparatus over the first communication service, and a connection requesting means for sending a connection request accompanied by the obtained setup information to the third apparatus via the first communication means so that the third apparatus is connected to the fourth apparatus over the second communication service. The second apparatus has a second communication means for communicating with the fourth apparatus, a second setup information obtaining means for obtaining the setup information from the fourth apparatus via the second communication means in response to the setup information obtaining request from the first apparatus, and a first setup information sending means for sending the obtained setup information to the first apparatus over the first communication service. The third apparatus has a third communication means for communicate with the first apparatus, and a connection processing means for connecting, upon receiving the connection request from the first apparatus via the third communication means, the third apparatus to the fourth apparatus over the second communication service using the received setup information. The fourth apparatus has a fourth communication means for communicating with the second apparatus, and a second setup information sending means for sending the setup information to the second apparatus via the fourth communication means in response to a request for obtaining the setup information from the second apparatus.

In the foregoing communication system, the setup information requesting means of the first apparatus requests, over the first communication service, the second apparatus to provide the setup information used for achieving a connection to the fourth apparatus over the second communication service, when, for example, the first and the second apparatuses are communicating with each other over the first communication service. The second setup information obtaining means of the second apparatus obtains the setup information from the fourth apparatus via the second communication means. At this time, the second setup information sending means of the fourth apparatus sends the setup information to the second apparatus via the fourth communication means in response to the request for setup information from the second apparatus. The first setup information sending means of the second apparatus then sends the obtained setup information to the first apparatus over the first communication service. The first setup information obtaining means of the first apparatus obtains the setup information from the second apparatus over the first communication service. The connection requesting means of the first apparatus then sends a connection request accompanied by the obtained setup information to the third apparatus via the first communication means so that the third apparatus is connected to the fourth apparatus over the second communication service. Upon receiving the connection request from the first apparatus, the connection processing means of the third apparatus connects the third apparatus to the fourth apparatus over the second communication service using the received setup information.

In the communication system according to an embodiment of the present invention, the first apparatus requests the third apparatus to provide the setup information, used for achieving a connection to the third apparatus over the second communication service, when the first and the second apparatuses are communicating with each other over the first communication service. The third apparatus sends the setup information back to the first apparatus. The first apparatus then sends a connection request accompanied by the obtained setup information to the second apparatus over the first communication service so that the fourth apparatus is connected to the third apparatus over the second communication service. The second apparatus then sends a connection request accompanied by the received setup information to the fourth apparatus so that the fourth apparatus is connected to the third apparatus over the second communication service using the setup information. The fourth apparatus connects to the third apparatus over the second communication service using the received setup information in response to the connection request. This allows the each user of the first and the second apparatuses to start the communication between the third and the fourth apparatuses over the second communication service without performing any setup operation for establishing a connection over the second communication service, such as an input operation of the setup information. Therefore, each user can continue the communication by switching the first communication service to the second communication service with simple operations.

In the communication system according to an embodiment of the present invention, the first apparatus requests, over the first communication service, the second apparatus to provide the setup information used for achieving a connection to the fourth apparatus over the second communication service, when the first and the second apparatuses are communicating with each other over the first communication service. The second apparatus obtains the setup information from the fourth apparatus via the second communication means, and then sends the setup information to the first apparatus over the first communication service. The first apparatus sends a connection request accompanied by the setup information, obtained from the second apparatus, to the third apparatus via the first communication means so that the third apparatus is connected to the fourth apparatus over the second communication service. Upon receiving the connection request from the first apparatus, the third apparatus connects to the fourth apparatus over the communication service using the received setup information. This allows the each user of the first and the second apparatuses to start the communication between the third and the fourth apparatuses over the second communication service without performing any setup operation for establishing a connection over the second communication service, such as an input operation of the setup information. Therefore, each user can continue the communication by switching the first communication service to the second communication service with simple operations.

DESCRIPTION OF THE PREFERRED EMBODIMENTS

In the following, embodiments of the present invention will be described in detail with reference to the drawings.

Figure 1:
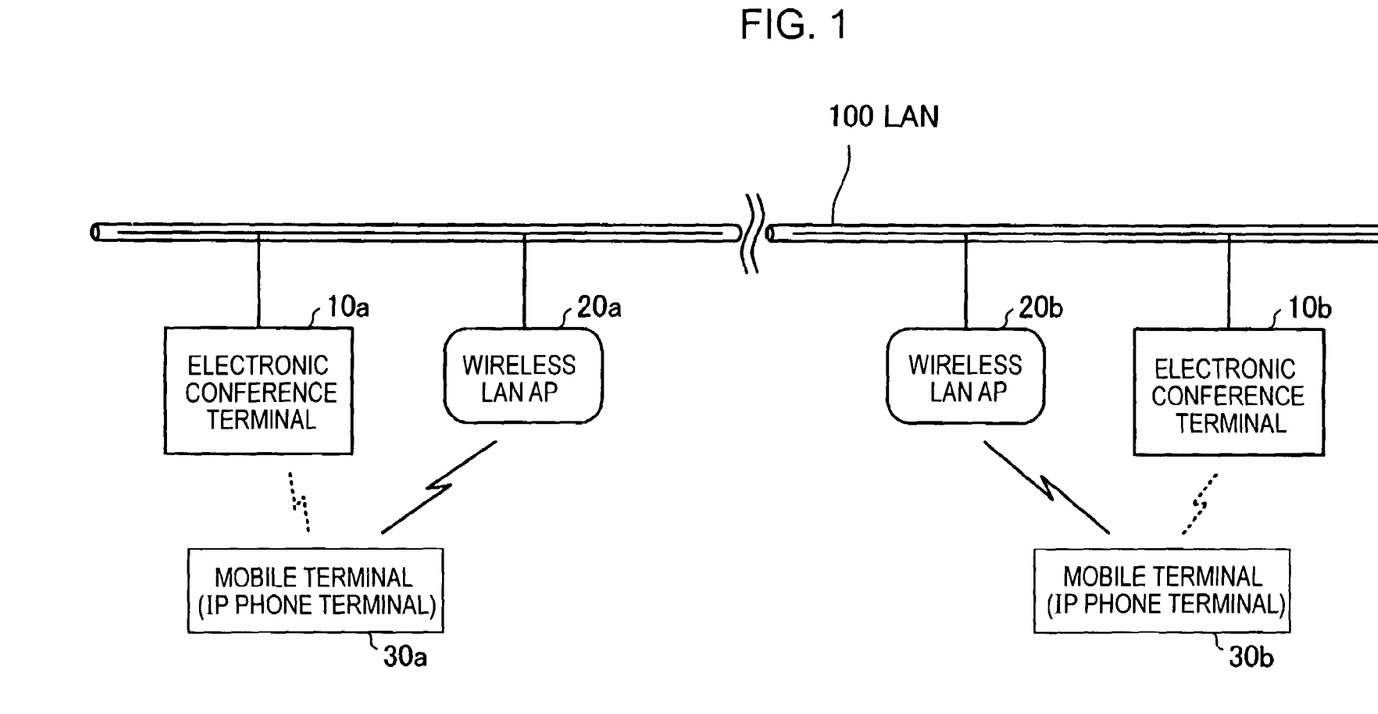
FIG. 1 illustrates an exemplary configuration of a communication system according to an embodiment of the present invention.

FIG. 1 illustrates an exemplary configuration of a communication system according to an embodiment of the present invention.

More specifically, FIG. 1 illustrates an exemplary configuration of a communication system implementing two communication services, for example, an electronic conference service and an IP telephony service, over a network using TCP (transmission Control Protocol)/IP. For example, SIP (Session Initiation Protocol), a voice/video communication protocol may be employed in these services.

In this system, as shown in FIG. 1, electronic conference terminals 10a and 10b and wireless LAN (Local Area Network) access points (APs) 20a and 20b are interconnected through a LAN (including a WAN (Wide Area Network) connected to the LAN) 100. Mobile terminals 30a and 30b are capable of wirelessly connecting to the LAN 100 through the wireless LAN access points 20a and 20b, respectively.

The electronic conference terminals 10a and 10b, used for carrying out a electronic conference between remote conference rooms, are capable of sending and receiving video and voice signals to each other through the LAN 100. Each of the electronic conference terminals 10a and 10b includes a radio communication interface used for a communication via a short-range radio communication, being capable of communicating with the mobile terminals 30a and 30b in a contactless manner via this communication, respectively.

The wireless LAN access points 20a and 20b, which are connected to the LAN 100 with cables, act as base stations for enabling the wireless LAN devices (in this case, the mobile terminals 30a and 30b) to wirelessly connect to the LAN 100. The wireless LAN access points 20a and 20b may also include various security functions or the like needed while transmitting and receiving information wirelessly.

The mobile terminals 30a and 30b, namely remote stations, are connected to the LAN 100 through the wireless LAN access points 20a and 20b, respectively, and act as telephone terminals in the IP telephony service based on VoIP (Voice over Internet Protocol) via this connection. Furthermore, each of the mobile terminals 30a and 30b includes a communication interface used for a communication via short-range radio communication, being capable of communicating with the electronic conference terminals 10a and 10b, respectively, in a contactless manner via this communication.

In this communication system, pairs of the electronic conference terminal 10a or 10b and the wireless LAN access point 20a or 20b, respectively, are installed at different remote offices or conference rooms. Additionally, one of the users of the electronic conference terminal 10a or 10b may carry the mobile terminal 30a or 30b, respectively. The user is capable of making a call by connecting the mobile terminal 30a or 30b to the wireless LAN access point 20a or 20b, respectively.

Additionally, the mobile terminals 30a and 30b are capable of communicating with the electronic conference terminals 10a and 10b via the short-range radio communication, respectively. In this embodiment, an infrared communication is used as an example of the short-range radio communication. While executing an application for implementing an electronic conference, the electronic conference terminals 10a may detect the mobile terminal 30a via short-range radio communication, and authenticate it. After the authentication, transmission and reception of information between the electronic conference terminal 10a and the mobile terminal 30a via short-range radio communication is enabled. Otherwise, the electronic conference terminal 10a may be connected to the mobile terminal 30a through the LAN 100 after authentication, thereby, for example, enabling the electronic conference terminal 10a to be operated in accordance with control commands sent from the mobile terminal 30a. Likewise, transmission and reception of information between the electronic conference terminal 10b and the mobile terminal 30b via short-range radio communication or the LAN 100 is enabled.

Figure 2:
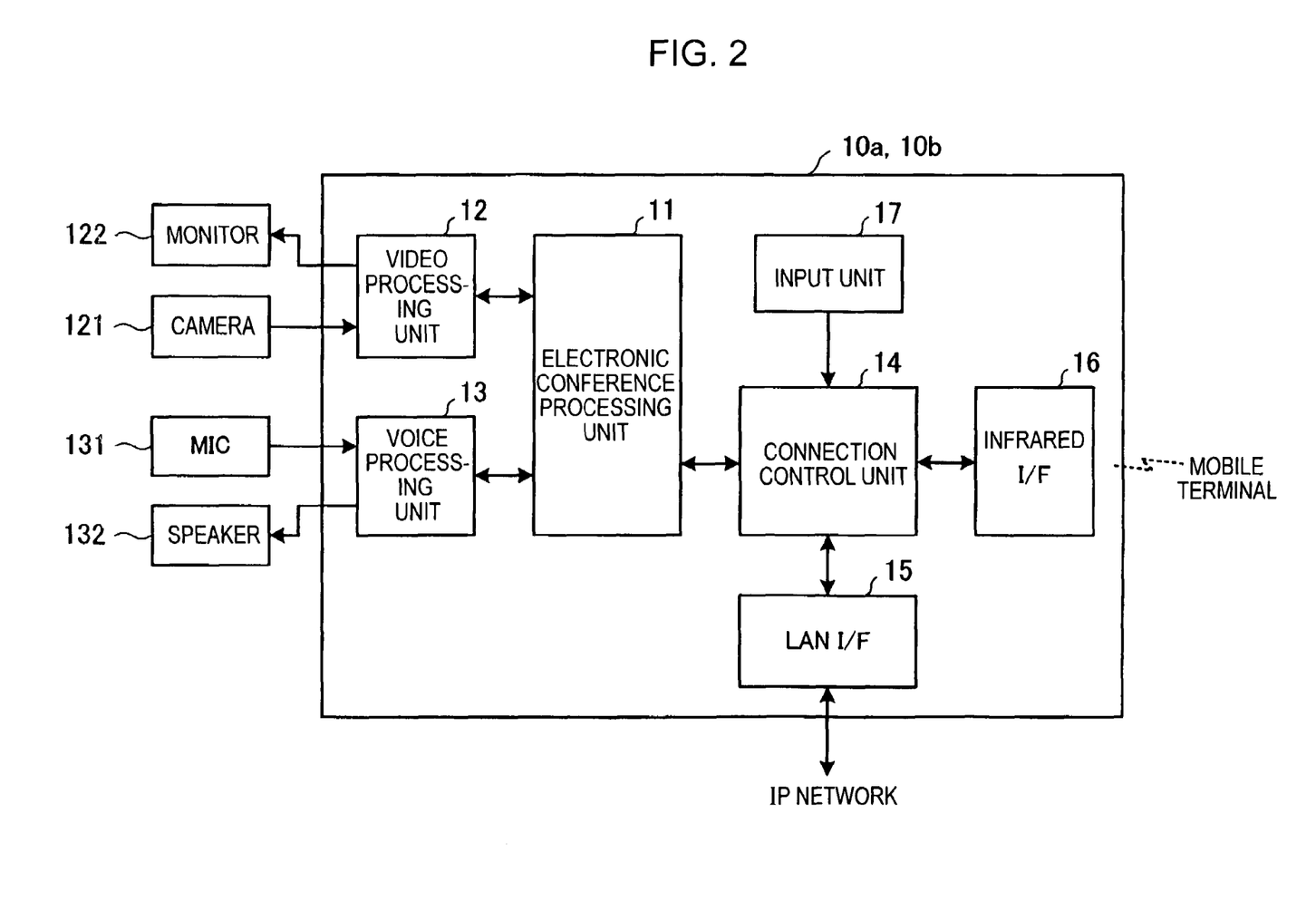
FIG. 2 is a block diagram illustrating an internal configuration of an electronic conference terminal.

FIG. 2 is a block diagram illustrating an internal configuration of an electronic conference terminal.

The electronic conference terminals 10a and 10b have an identical configuration. More specifically, the electronic conference terminal 10a or 10b includes an electronic conference processing unit 11, a video processing unit 12, an voice processing unit 13, a connection control unit 14, a LAN interface 15, an infrared interface 16, and an input unit 17 as shown in FIG. 2.

The electronic conference processing unit 11 executes processings for implementing an electronic conference. More specifically, the electronic conference processing unit 11 executes basic processings for receiving the electronic conference service and processings for video/voice signal input and output. Such basic processings include a connection setup to a destination terminal of the electronic conference, an image capturing and voice recording setup, and an output setup of the video and voice signals. In the processings for video/voice signal input and output, the followings are executed. The electronic conference processing unit 11 outputs the video signal supplied from the video processing unit 12 and the voice signal supplied from the voice processing unit 13 to the connection control unit 14. The electronic conference processing unit 11 also output the video signal and the voice signal, which are supplied from the LAN 100 through the LAN interface 15 and the connection control unit 14, to the video processing unit 12 and the voice processing unit 13, respectively.

The video processing unit 12 converts the video signal captured at a camera 121, which is externally connected, into a digital signal, and encodes the digital signal in a predetermined format before outputting it to the electronic conference processing unit 11. The video processing unit 12 also decodes the video signal supplied from the electronic conference processing unit 11, and converts the decoded signals into analog signals before outputting it to a monitor 122, which is externally connected, to display the video thereon. The voice processing unit 13 converts an voice signal supplied from a microphone 131, which is externally connected, into a digital signal, and encodes the digital signal in a predetermined format before outputting it to the electronic conference processing unit 11. The voice processing unit 13 also decodes the voice signal supplied from the electronic conference processing unit 11, and converts the decoded signal into the analog signal before outputting it to a speaker 132, which is externally connected, to play back the voice signal.

The connection control unit 14 controls operations of the electronic conference processing unit 11. The connection control unit 14 also executes processings to enable the remote control operation of the electronic conference processing unit 11 using the mobile terminal 30a or 30b detected by the infrared interface 16. For example, the connection control unit 14 performs a connection control to the destination terminals of the conference and a transfer control of the video and voice signals between the electronic conference processing unit 11 and the LAN interface 15 in response to signals or control commands. The signals or the control commands may be sent from the input unit 17, or the mobile terminal 30a or 30b through the infrared interface 16 or the LAN interface 15. Additionally, the connection control unit 14 executes an authentication processing of the mobile terminal 30a or 30b detected by the infrared interface 16.

The LAN interface 15, which is connected to the LAN 100, controls transmission and reception of signals between the LAN 100 and the connection control unit 14. The infrared interface 16 includes an infrared receiver and transmitter of the infrared signals. The infrared interface 16 controls transmission and reception of the infrared signals between mobile terminal 30a or 30b and the electronic conference terminal 10a or 10b, respectively. The input unit 17, which includes input key or the like, outputs control signals corresponding to the input operation of the user to the connection control unit 14.

Figure 3:
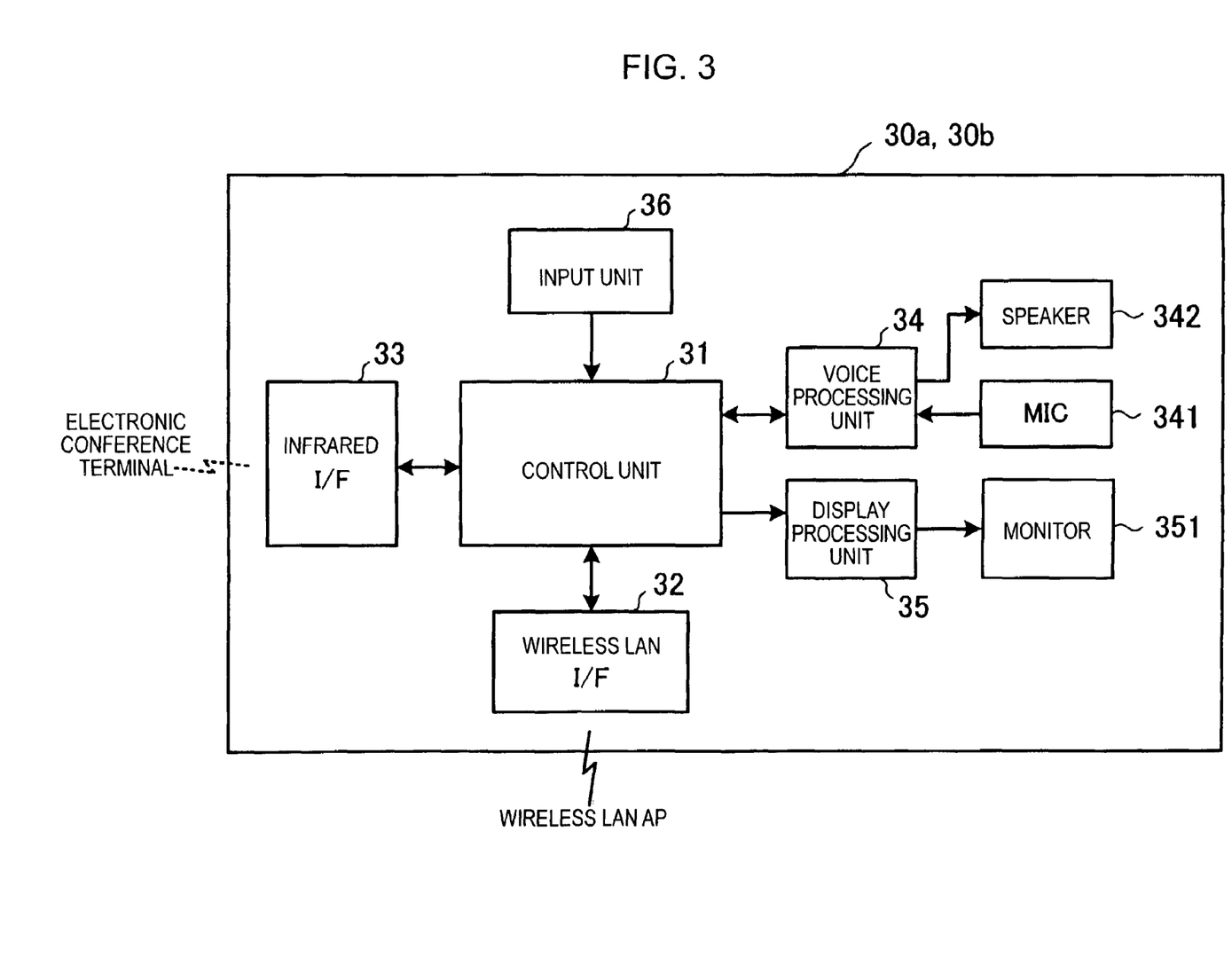
FIG. 3 is a block diagram illustrating an internal configuration of a mobile terminal.

FIG. 3 is a block diagram illustrating an internal configuration of a mobile terminal.

The mobile terminals 30a and 30b have an identical configuration. More specifically, the mobile terminal 30a or 30b includes a control unit 31, a wireless LAN interface 32, an infrared interface 33, a voice processing unit 34, a display processing unit 35, an input unit 36, a microphone 341, a speaker 342, and a monitor 351 as shown in FIG. 3.

The control unit 31, which includes a CPU and a memory for storing programs executed by the CPU and various data, performs an overall control on each block in the mobile terminals 30a and 30b. More specifically, the control unit 31 executes a call processing for an IP telephony service through the wireless LAN interface 32. In other words, the control unit 31 outputs the voice signal supplied from the voice processing unit 34 to the wireless LAN interface 32 as well as the voice signal received through the wireless LAN interface 32 to the voice processing unit 34. The control unit 31 also executes a processing concerning to a transmission and reception of various data such as address information and control commands through the wireless LAN interface 32 or the infrared interface 33, a processing to generate display information used in the monitor 351 before outputting it to the display processing unit 35, and so forth.

The wireless LAN interface 32 is an interface circuit for connecting the mobile terminal 30a or 30b to the LAN 100 through the wireless LAN access point 20a or 20b, respectively. The wireless LAN interface 32 demodulates the signal received from the wireless LAN access point 20a or 20b, and supplies the demodulated signal to the control unit 31. The wireless LAN interface 32 also modulates the signal output from the control unit 31, and wirelessly transmits the modulated signal to the wireless LAN access point 20a or 20b. The infrared interface 33, which includes an infrared receiver and transmitter of the infrared signals, controls transmission and reception of the infrared signals between the electronic conference terminal 10a or 10b and the mobile terminal 30a or 30b, respectively.

The voice processing unit 34 converts the voice signal supplied from the microphone 131 into the digital signal, and encodes the digital signal in a predetermined format before outputting it to the control unit 31. The voice processing unit 34 also decodes the voice signal supplied from the control unit 31, and converts the decoded signal into the analog signal before outputting it to the speaker 342 to play back the voice signal. The display processing unit 35 generates the video signal based on the display information generated by the control unit 31, and then outputs it to the monitor 351 to display the video thereon. The monitor 351, for example, may be an LCD (Liquid Crystal Display). The input unit 36, which includes an input key or the like, outputs a control signal corresponding to the input operation of the user to the control unit 31.

Now, suppose users are talking on the IP phone between the mobile terminals 30a and 30b in the communication system described above. If the users encounter the situation where they need not only an voice communication but also a video communication during their talk, the users may start an electronic conference using the electronic conference terminals 10a and 10b located near them. In this case, one of the users, for example, needs to select a destination terminal of the electronic conference terminal 10a or 10b that is used by this user, and perform some operations to connect the user's terminal to the destination terminal according to the known art. If the user does not know an address of the destination terminal, the user needs to input the address to the own terminal after obtaining the address over IP telephony service to complete the connection setup.

In contrast, according to embodiments of the present invention, each user of the mobile terminal 30a or 30b first enables communication between the mobile terminal 30a or 30b and the electronic conference terminal 10a or 10b located near each user, respectively. This simple operation allows the users to switch the communication between the mobile terminals 30a and 30b to the electronic conference terminals 10a and 10b and start the electronic conference without the user's recognition of the address of the destination electronic conference terminal.

In the following, operations of switching communication service will be described. Hereinafter, a user using a mobile terminal 30a and an electronic conference terminal 10a is assumed as user A, and a user using a mobile terminal 30b and an electronic conference terminal 10b is assumed as user B.

First Embodiment

Figure 4:
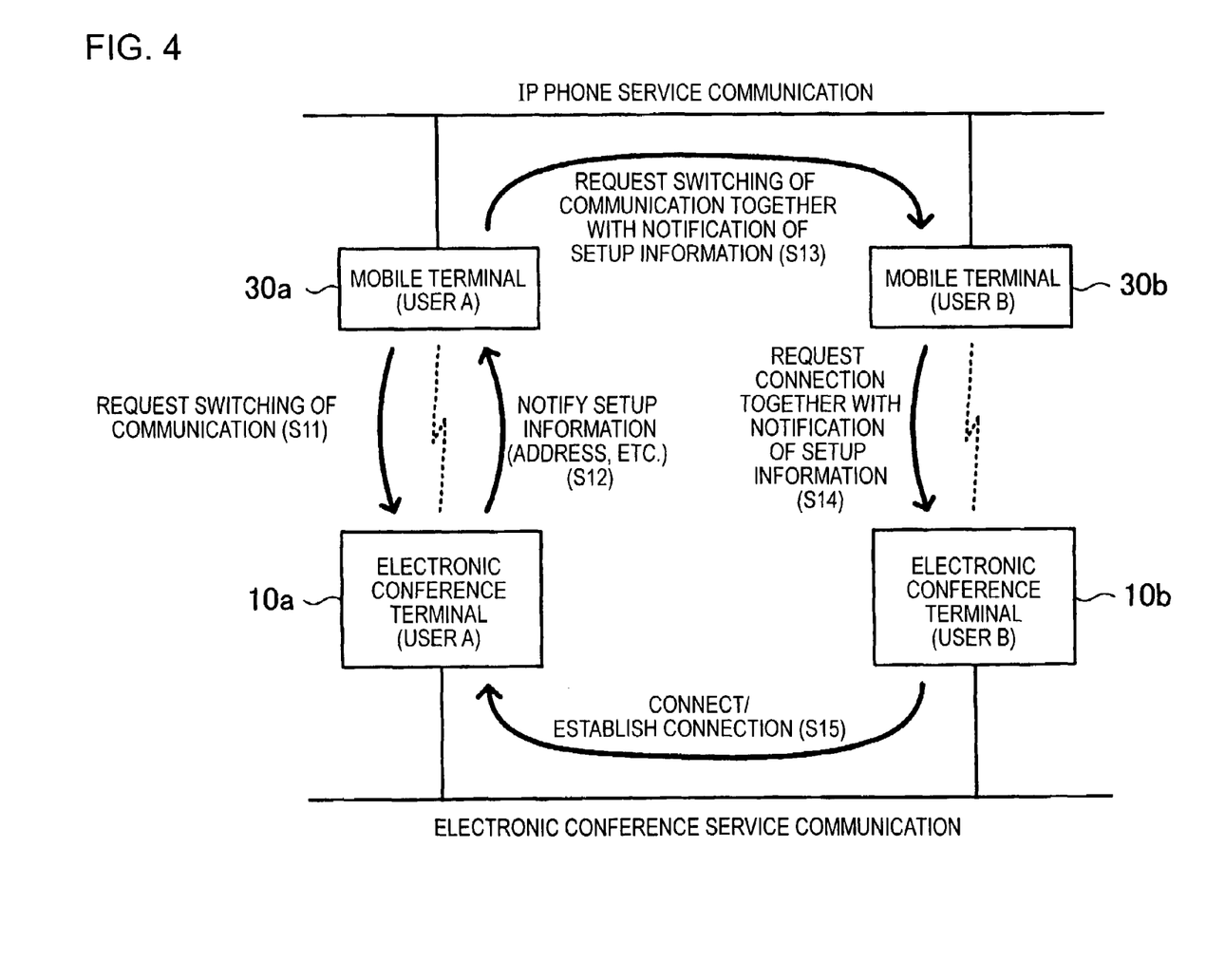
FIG. 4 illustrates an overview of a first embodiment of a communication service switching operation.

FIG. 4 illustrates an overview of a first embodiment of a communication service switching operation.

Referring to FIG. 4, communication services are separately depicted for ease of explanation. For example, a communication of an IP telephony service is depicted in upper part of the figure, and a communication of an electronic conference service is depicted in lower part of the figure. FIG. 4 also illustrates that the mobile terminals 30a and 30b are connected to the electronic conference terminals 10a and 10b with a short-range communication that employs infrared radiation, respectively.

In the initial state, the user A and the user B are talking on the phone with the mobile terminals 30a and 30b connected via the communication of the IP telephony service. The user A and user B then cause the mobile terminals 30a and 30b, carried by each user, to communicate with the electronic conference terminals 10a and 10b located near them, respectively, via short-range radio communication (in this case, infrared communication). With this communication, the electronic conference terminals 10a and 10b detect the mobile terminals 30a and 30b, respectively, thereby enabling the mobile terminals 30a and 30b to execute the following procedure.

The mobile terminal 30a sends a request for switching the communication service to the electronic conference terminal 10a as an infrared signal (at STEP S11). The electronic conference terminal 10a then notifies the mobile terminal 30a of setup information (for example, an address, etc.) that is necessary for achieving a connection to the electronic conference terminal 10a over the electronic conference service (at STEP S22). Upon receiving the setup information, the mobile terminal 30a sends a request for switching the communication service accompanied by the setup information to the mobile terminal 30b on the destination side using the communication of the IP telephony service (at STEP S13).

The mobile terminal 30b on the destination side sends a request for connecting the electronic conference terminals 10a and 10b accompanied by the notified setup information to the electronic conference terminal 10b (at STEP S14). The electronic conference terminal 10b finally transmits a connection request to the electronic conference terminal 10a via communication of the electronic conference service using the notified setup information so that the connection between the electronic conference terminals 10a and 10b is established (at STEP S15).

According to the procedure described above, if the user A causes the mobile terminal 30a to communicate with the electronic conference terminal 10a, the setup information, such as the address of the electronic conference terminal 10a, is automatically obtained and notified to the electronic conference terminal 10b on the destination side, thereby allowing the users to start the electronic conference. This advantageously eliminates the necessity for the user A to perform any connection setup operation in order to start the electronic conference. Even if the user A does not know the setup information, such as the address, used for starting the electronic conference in advance, the users can start the electronic conference without recognizing the setup information, i.e., without performing any input operation of the setup information.

Figure 5:
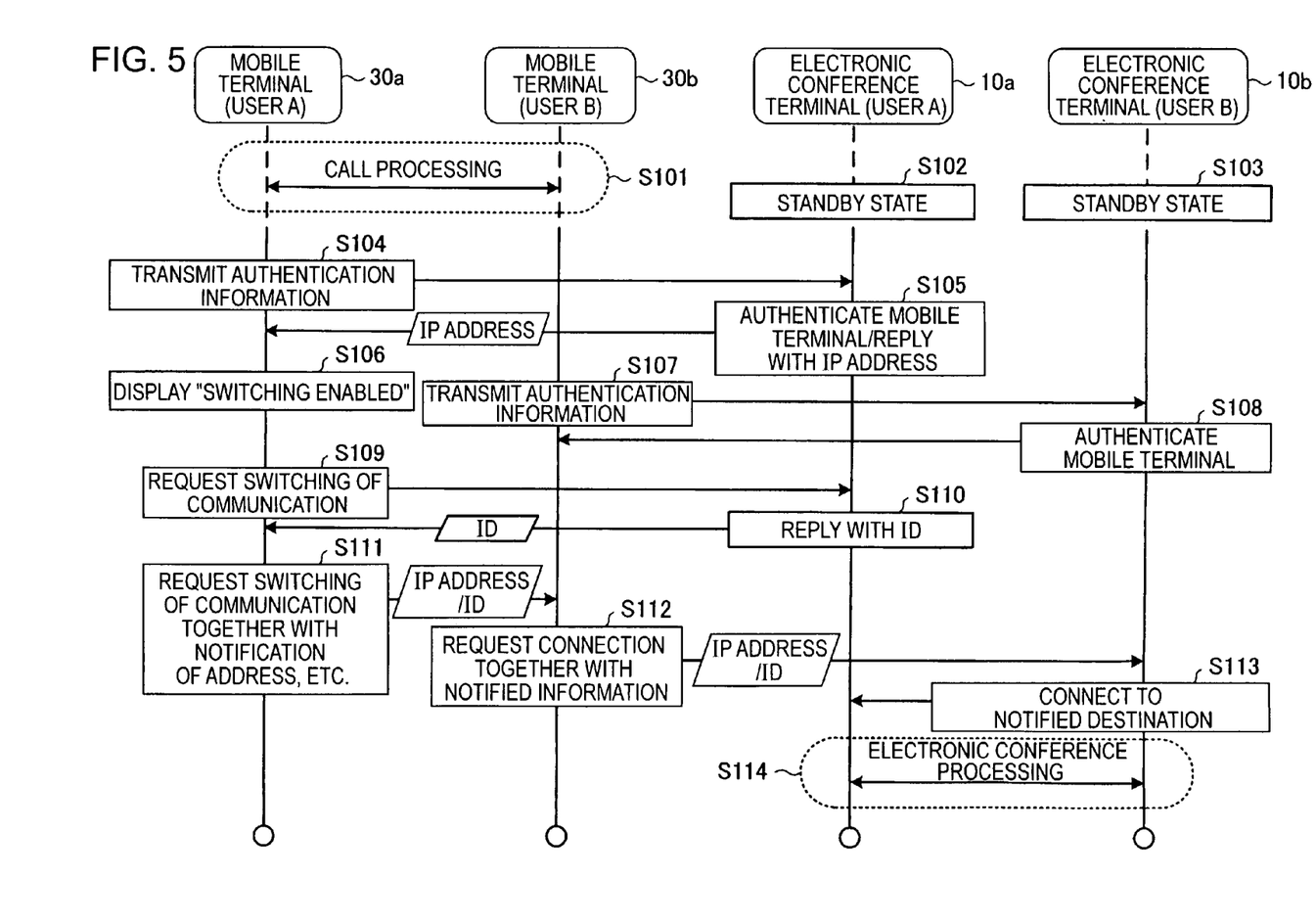
FIG. 5 illustrates a processing sequence in a first embodiment of a communication service switching operation.

FIG. 5 illustrates a processing sequence in a first embodiment of a communication service switching operation. Referring to this figure, the preceding procedure will be described in more detail.

In the initial state depicted in FIG. 5, the user A and user B are talking on the phone over the IP telephony service with the mobile terminals 30a and 30b connected to the LAN 100 through the wireless LAN access points 20a and 20b, respectively (at STEP S101). As described below at the STEPs S104, S105, S107, and S108, the user A and user B cause the mobile terminals 30a and 30b to be detected by the electronic conference terminals 10a and 10b located near them, respectively, to start the electronic conference. Meanwhile, the electronic conference terminals 10a and 10b have been booted and held in standby state to wait for receiving a request for starting electronic conference processing through the input unit 17 or the infrared interface 16 (at STEPs 102 and 103).

The mobile terminal 30a first transmits authentication information to the electronic conference terminal 10a as an infrared signal in response to an operation of the user A (at STEP S104). The authentication information includes an IP address and identification information of the mobile terminal 30a.

Upon receiving the infrared signal from the mobile terminal 30a, the connection control unit 14 executes a processing on the received information so that the electronic conference terminal 10a authenticates the mobile terminal 30a (at STEP S105). For example, the electronic conference terminal 10a may be configured to receive a registration of the mobile terminal 30a capable of controlling the electronic conference processing in advance. Alternatively, the mobile terminal 30a may be registered to a server or the like in advance. In this case, upon detecting the mobile terminal 30a, the electronic conference terminal 10a may access the server and provide the authentication information of the mobile terminal 30a to the server. The server may then authenticate the mobile terminal 30a based on the authentication information and administrate it.

After authentication of the mobile terminal 30a has been completed, the electronic conference terminal 10a transmits own IP address or identification information back to the mobile terminal 30a as an infrared signal. Upon receiving the signal from the electronic conference terminal 10a, the mobile terminal 30a check the signal to confirm that the authentication has been properly completed. The mobile terminal 30a then waits for the user's input operation while displaying the message indicating that the switching of the communication service is enabled on the monitor 351 (at STEP S106).

Likewise, the mobile terminal 30b transmits the infrared signal to the electronic conference terminal 10b in response to the operation performed by the user B (at STEP S107). The electronic conference terminal 10b then authenticates mobile terminal 30b (at STEP S108). After the authentication, the mobile terminal 30b are shifted to the standby state to wait for receiving a request signal for switching the communication service sent from the mobile terminal 30a through the infrared interface 33 (or the wireless LAN interface 32).

The user A gives the mobile terminal 30a a request for switching the communication service by operating the input unit 36 in the mobile terminal 30a. The mobile terminal 30a then sends the request for switching the communication service to the electronic conference terminal 10a as the infrared signal (at STEP S109). In response to the request from the mobile terminal 30a, the electronic conference terminal 10a sends the setup information, necessary for achieving a connection to the electronic conference terminal 10a over the electronic conference service, back to the mobile terminal 30a as the infrared signal (at STEP S110). The setup information includes, for example, the IP address (in this case, the IP address is not sent since it has already sent at a time of authentication) and the ID based on SIP (SIP ID).

In this embodiment, both the electronic conference service and the IP telephony services are provided through the LAN 100. Therefore, the above-mentioned request signal for switching the communication service and its reply may be sent between the mobile terminal 30a and the electronic conference terminal 10a through the LAN 100. This conveniently gives the user A an improved usability by eliminating the necessity for the user A to direct the infrared receiver and transmitter of the mobile terminal 30a at the electronic conference terminal 10a to transmit and receive the infrared signals. In this case, the above-mentioned request signal for switching the communication service may be automatically sent to the electronic conference terminal 10a without waiting for the user's input operation.

With the above-described procedure, the mobile terminal 30a has obtained all the setup information that is necessary for establishing a connection over the electronic conference service such as the address information of the electronic conference terminal 10a. Using the IP telephony service, the mobile terminal 30a then sends a request for switching the communication service accompanied by the setup information to the mobile terminal 30b (at STEP S111). The setup information may be sent to the mobile terminal 30b, for example, according to the protocol for sending messages in VoIP.

Upon receiving the setup information such as the IP address and SIP ID, the mobile terminal 30b carried by the user B sends a connection request accompanied by the received setup information to the electronic conference terminal 10b, which has been authenticated, as the infrared signal so that the electronic conference terminal 10b is connected to the electronic conference terminal 10a on the destination side (at STEP S112). The setup information may be likewise sent through the LAN 100 instead of using the infrared signal, thereby giving the user B an improved usability.

Using this setup information, the electronic conference terminal 10b starts a connection procedure based on SIP, upon receiving the setup information such as the address. More specifically, the electronic conference terminal 10b transmits a connection request to the electronic conference terminal 10a through the LAN 100 so that a connection is established (at STEP S113). This results in the establishment of the connection between the electronic conference terminals 10a and 10b, thereby causing the electronic conference processing unit 11 in each electronic conference terminal to start an voice/video transmitting-receiving processing (at STEP S144).

The users A and B can carry out the electronic conference using the electronic conference terminals 10a and 10b after the above-described procedure has been completed. At this time, the connection session between the mobile terminals 30a and 30b over the IP telephony service may be kept alive or terminated.

According to the procedure described above, both the user A and user B can switch the communication service with simple operations on the mobile terminals 30a and 30b, respectively, without recognizing the setup information used for establishing a connection of the electronic conference service, thereby starting the electronic conference. The setup information includes the addresses of the electronic conference terminals 10a and 10b. Additionally, the user A and user B can start the electronic conference with an intuitive operation, in which each of the users just approaches the electronic conference terminal 10a and 10b, so as to cause the mobile terminals 30a and 30b in use to be detected by the electronic conference terminals 10a and 10b, respectively. Thus, even the user, barely having the knowledge about the network or the operation of the electronic conference terminals 10a and 10b, can start the electronic conference with the same partner of the communication of the IP phone service without difficulty.

Second Embodiment

Figure 6:
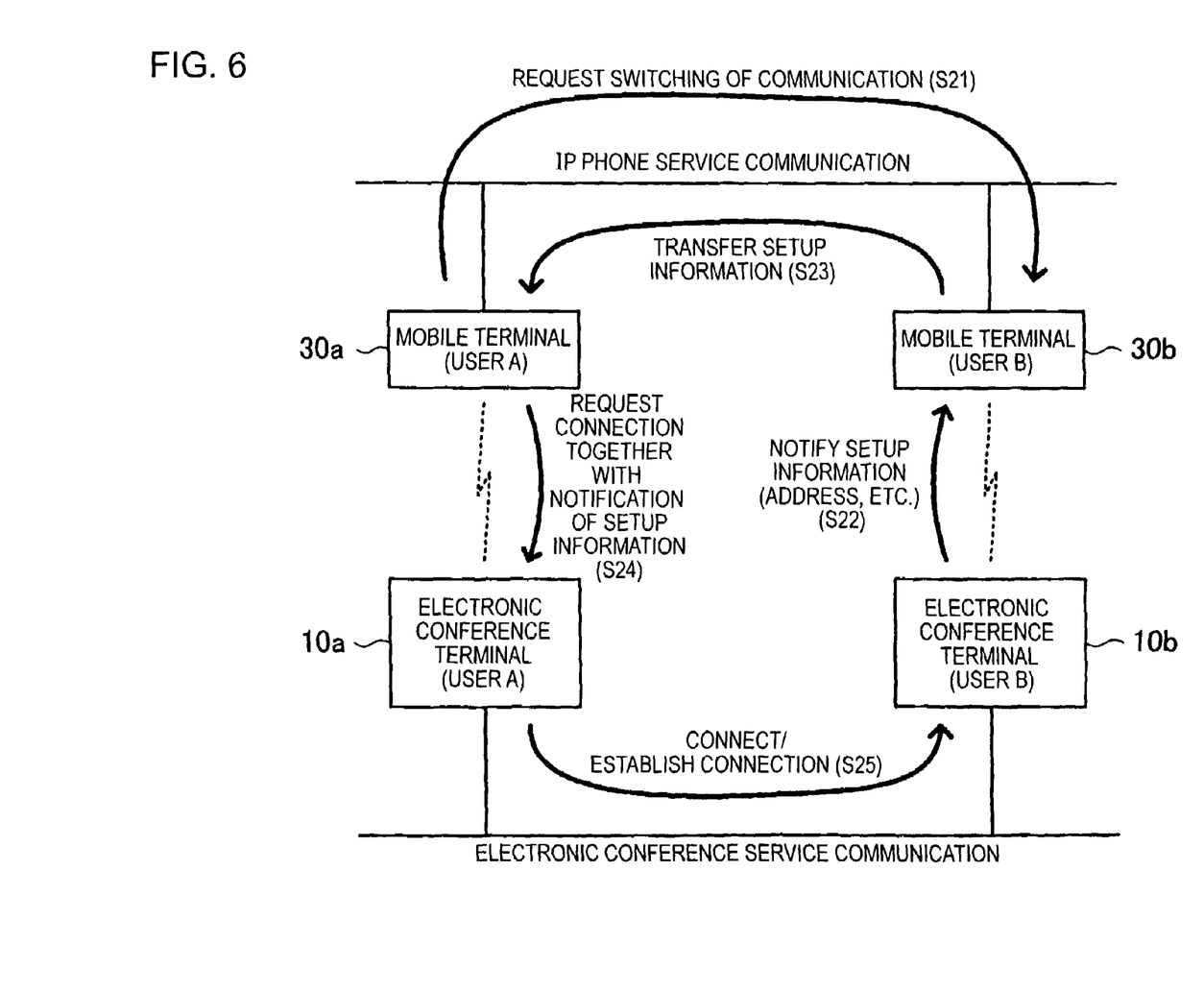
FIG. 6 illustrates an overview of a second embodiment of a communication service switching operation.

FIG. 6 illustrates an overview of a second embodiment of a communication service switching operation.

Referring to FIG. 6, communication services are separately depicted for ease of explanation as is the case with FIG. 4. A procedure in the embodiment depicted in FIG. 6 is different from that in the embodiment depicted in FIG. 4. A mobile terminal 30a is notified of setup information, such as address information of an electronic conference terminal 10b on a destination side, through a mobile terminal 30b. Using this setup information, the mobile terminal 30a cause the electronic conference terminal 10a on own side to start a connection procedure.

After the mobile terminals 30a and 30b has been detected by the electronic conference terminals 10a and 10b, respectively, the mobile terminal 30a sends a request for switching the communication service to the mobile terminal 30b via the communication of an IP telephony service (at STEP S21). The mobile terminal 30b then sends a request for setup information, such as an address, necessary for establishing the connection to the electronic conference terminal 10b. Upon receiving the setup information (at STEP S22), the mobile terminal 30b transfers the setup information to the mobile terminal 30a (at STEP S23).

The mobile terminal 30a sends a connection request accompanied with the received setup information to the electronic conference terminal 10a so as to achieve a connection to the electronic conference terminal 10b on the destination side (at STEP S24). Using the received setup information, the electronic conference terminal 10a transmits a connection request to the electronic conference terminal 10b so that the connection between the electronic conference terminals 10a and 10b are established (at STEP S25).

According to the procedure described above, if the user A causes the mobile terminal 30a to communicate with the electronic conference terminal 10a, the setup information of the electronic conference terminal 10b is automatically obtained, and notified to the electronic conference terminal 10a used by the user A, thereby allowing the users to start the electronic conference. The user A can advantageously start the electronic conference without performing any setup operation to start the electronic conference.

Figure 7:
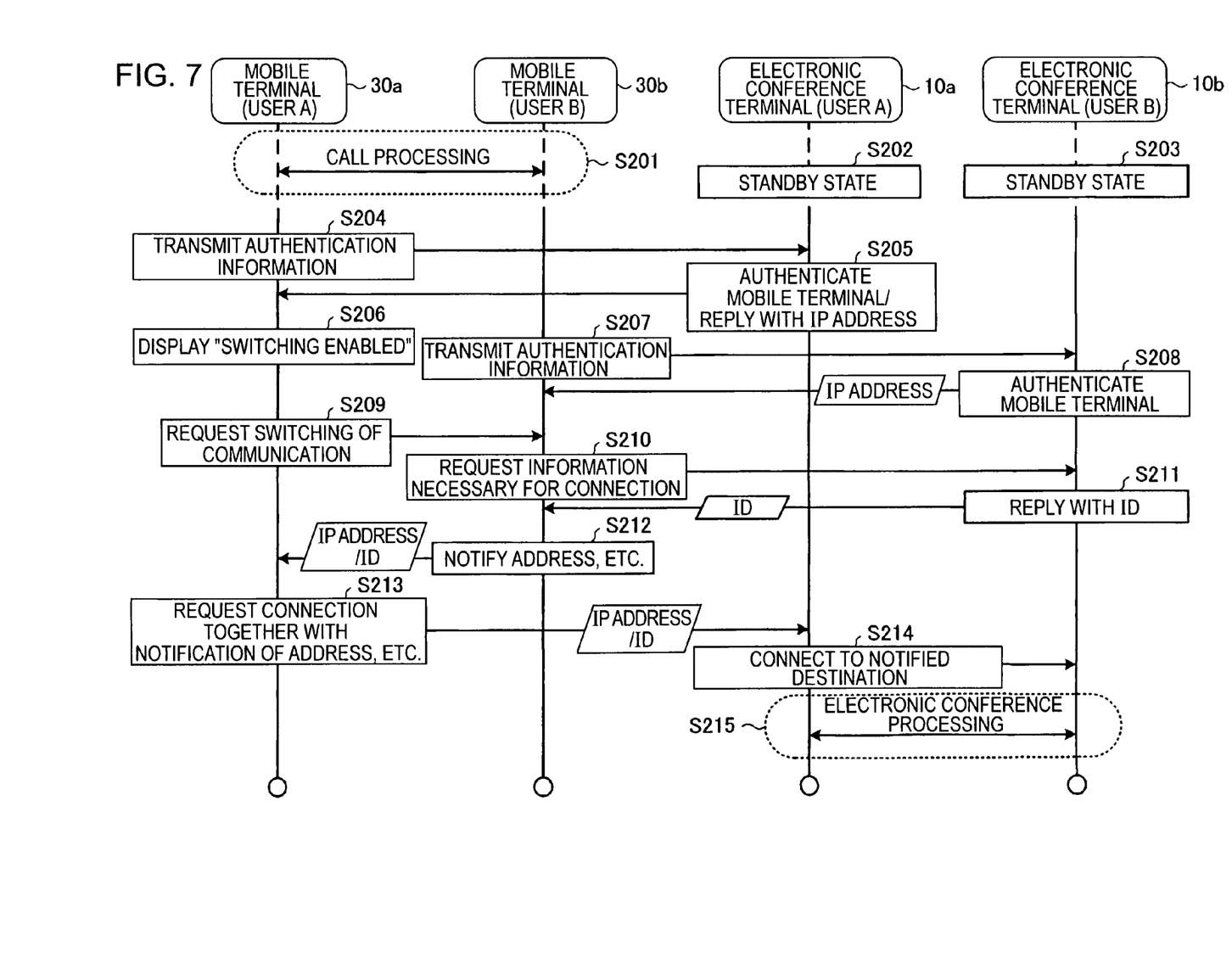
FIG. 7 illustrates a processing sequence in a second embodiment of a communication service switching operation.

FIG. 7 is a diagram illustrating a processing sequence in the second embodiment of a switching operation of communication services. Referring to this figure, the preceding procedure will be described in more detail.

Processings executed at STEPs S201 to S208 in FIG. 7 are the same as those executed at STEPs S101 to S108 in FIG. 5 described above. More specifically, the user A and user B are talking on the phone over the IP telephony service at first, and then cause the mobile terminals 30a and 30b to be detected by the electronic conference terminals 10a and 10b, respectively, so as to be authenticated. After the authentication, a message indicating that the switching the communication service is enabled is displayed on a monitor 351 of the mobile terminal 30a used by the user A. Upon confirming the message, i.e., for example, upon confirming the authentication of the mobile terminal 30b has been completed by the user B over the IP phone service, the user A causes the mobile terminal 30a to execute the switching procedure by operating the mobile terminal 30a. The mobile terminal 30a sends a request signal for switching communication service to the mobile terminal 30b through the LAN 100 in response to the operation of the user A (at STEP S209). This signal may be sent to the mobile terminal 30b, for example, using a protocol for sending messages in VoIP.

Upon receiving the request for switching the communication service, the mobile terminal 30b sends the request for the setup information to the electronic conference terminal 10b (at STEP S210). The setup information is necessary for achieving a connection to the electronic conference terminal 10b in order to start the electronic conference service. The electronic conference terminal 10b sends the necessary information (in this case, SIP ID) back to the mobile terminal 30b, in response to the request for the setup information (at STEP S211). Through the LAN 100, the mobile terminal 30b notifies the mobile terminal 30a of all the setup information that is necessary for establishing the connection, upon receiving the SIP ID (at STEP S212). The setup information may include the SIP ID and the IP address of the electronic conference terminal lob obtained during the authentication. The setup information may also be sent, for example, according to the protocol for sending messages in VoIP.

At STEPs S210 and S211, the setup information is sent or received, for example, via an infrared communication. In this embodiment, however, the mobile terminal 30b and the electronic conference terminal 10b are connected through the IP network, i.e. the LAN 100. Furthermore, the mobile terminal 30b is capable of recognizing the IP address of the electronic conference terminal 10b during the authentication. Therefore, the setup information may be sent or received through the LAN 100. This conveniently gives the user B an improved usability by eliminating the necessity for the user B to direct the infrared receiver and transmitter of the mobile terminal 30b at the electronic conference terminal 10b. Additionally, the processings at STEPs S210 to S212 can be automatically executed in this case, since the request for the setup information may be automatically sent at STEP S210 without the input operation of the user B. With this automation, the user B only cause the mobile terminal 30b carried by the user B to be detected by the electronic conference terminal 10b so as to start the electronic conference.

Upon receiving the setup information, the mobile terminal 30a sends a connection request accompanied by the received setup information to the electronic conference terminal 10a so as to establish the connection to the electronic conference terminal 10b on the destination side (at STEP S213). This connection request may be sent to the electronic conference terminal 10a as an infrared signal, however, it may be sent through the LAN 100 so as to give the user A an improved usability.

Using this setup information, the electronic conference terminal 10a starts a connection procedure based on SIP, upon receiving the setup information such as the address. More specifically, the electronic conference terminal 10a transmits a connection request to the electronic conference terminal 10b through the LAN 100 (at STEP S214). This results in the establishment of the connection between the electronic conference terminals 10a and 10b, thereby causing the electronic conference terminals 10a and 10b to start the electronic conference processing with voice and video (at STEP S215).

According to the procedure described above, both the user A and user B can switch the communication service with simple operations on the mobile terminals 30a and 30b, respectively, without recognizing the setup information used for establishing a connection over the electronic conference service, thereby starting the electronic conference. Additionally, the users A and B can start the electronic conference with an intuitive operation, in which each of the users just causes the mobile terminals 30a and 30b to communicate with the electronic conference terminals 10a and 10b, respectively, via the short-range radio communication. Thus, even the user, barely having the knowledge about the network or the operation on the electronic conference terminal 10a or 10b, can start the electronic conference with the same partner of the communication of the IP phone service without difficulty.

In the embodiments described above, an infrared communication is employed as a short-range radio communication. However, a Bluetooth, an electromagnetic induction communication using a radio IC chip, or the like may be employed as the short-range radio communication. Moreover, communications carried out using comparatively short cables such as USB (Universal Serial Bus) or IEEE (Institute of Electrical and Electronic Engineers) 1394 as well as the radio communications may be employed.

Furthermore, in the embodiments described above, an IP telephony service and an electronic conference service are applied to the embodiments as examples of the communication services, however, the present invention is not limited to these services. For example, it is possible to switch two kinds of predetermined communication services chosen from those such as a telephony service based on a known public telephone circuit, an email service, an instant messaging service, a videophone services, and so forth. Moreover, there is no need to implement the services to be switched over a common network as described above but the services may be implemented on physically different networks.

Additionally, as the mobile terminals 30a and 30b, not only telephone terminals but also, for example, PDAs (Personal Digital Assistants) capable of sending and receiving emails and instant messages, mobile apparatuses such as notebook computers, remote controls for the apparatuses that implement one of the communication services described above, or the like may be applied.

Furthermore, in the preceding embodiments, the procedure of switching the communication services is described in conjunction with separate apparatuses that provides different services, i.e., the mobile terminals and the electronic conference terminals. However, the embodiments of the present invention may be applied to integrated apparatuses providing multiple communication services. For example, the embodiments of the present invention can also be applied to a situation where the IP telephony service and the electronic conference service (or the videophone service) described above are implemented on one mobile terminal, and the communication modes are switched between communication services. In this case, the setup information is configured to be obtainable inside the apparatus between the applications executing respective communication services. If the application for the ongoing communication service and the application for the target communication service are incapable of being executed simultaneously, existing connection may be terminated just before the connection for the target communication service is established.

It should be understood by those skilled in the art that various modifications, combinations, sub-combinations and alterations may occur depending on design requirements and other factors insofar as they are within the scope of the appended claims or the equivalents thereof.

What is claimed is:

1. A communication system including a first and a second apparatuses communicating with each other over a first communication service, and a third and a fourth apparatuses communicating with each other over a second communication service, the communication system comprising:

the first apparatus including a communication unit configured to communicate with the third apparatus via short-range communication, and to communicate with the second apparatus via the first communication service, a setup information obtaining unit configured to obtain setup information from the third apparatus used to connect with the third apparatus over the second communication service, and a connection request unit configured to send a connection request accompanied by the setup information received from the third apparatus to the second apparatus over the first communication service, to enable the fourth apparatus to connect to the third apparatus over the second communication service; the second apparatus including a communication unit configured to communicate with the fourth apparatus via short-range communication and to communicate with the first apparatus via the first communication service, a connection request unit configured to send the connection request accompanied by the setup information, received from the first apparatus to the fourth apparatus, to enable the fourth apparatus to connect to the third apparatus over the second communication service using the setup information; the third apparatus including a communication unit configured to communicate with the first apparatus via short-range communication, and to communicate with the fourth apparatus via the second communication service, and a setup information sending unit configured to send the setup information to the first apparatus in response to a request for obtaining the setup information from the first apparatus; and the fourth apparatus including a communication unit configured to communicate with the second apparatus via short-range communication, and to communicate with the third apparatus via the second communication service, and a connection processing unit configured to connect the fourth apparatus to the third apparatus over the second communication service upon receiving the connection request from the second apparatus and the setup information.

2. The communication system according to claim 1, wherein the first and the third apparatuses each include an apparatus detecting unit configured to detect each other as a communication destination via short-range communication so as to enable communication between the first and the third apparatuses, and the second and the fourth apparatuses each include an apparatus detecting unit configured to detect each other as a communication destination via short-range communication so as to enable communication between the second and the fourth apparatuses.

3. The communication system according to claim 2, wherein, the communication units of the first and the third apparatuses are configured to communicate with each other using at least one of an identical network or the short-range communication when the first and the second communication services are provided over the identical network.

4. The communication system according to claim 2, wherein, the communication units of the second and the fourth apparatuses communicate with each other via an identical network when the first and the second communication services are provided over the identical network.

5. The communication system according to claim 1, wherein the setup information includes address information regarding the third apparatus used to connect with the second communication service.

6. The communication system according to claim 1, wherein either the first and the second apparatuses or the third and the fourth apparatuses are portable.

7. A communication system including a first and a second apparatuses communicating with each other over a first communication service and a third and a fourth apparatuses communicating with each other over a second service, the communication system comprising:

the first apparatus including a communication unit configured to communicate with the third apparatus via short-range communication, and to communicate with the second apparatus via the first communication service, a setup information requesting unit configured to request setup information from the second apparatus to connect with the fourth apparatus over the second communication service, a setup information obtaining unit configured to receive the setup information from the second apparatus over the first communication service, and a connection request unit configured to send a connection request accompanied by the setup information received from the second apparatus to the third apparatus to enable the third apparatus to connect to the fourth apparatus over the second communication service;

the second apparatus including a communication unit configured to communicate with the fourth apparatus via short-range communication and to communicate with the first apparatus via the first communication service, a setup information obtaining unit configured to obtain the setup information from the fourth apparatus in response to the request for obtaining the setup information received from the first apparatus, and a setup information sending unit configured to send the obtained setup information to the first apparatus over the first communication service; the third apparatus including a communication unit configured to communicate with the first apparatus via short-range communication, and to communicate with the fourth apparatus via the second communication service, and a connection processing unit configured to connect the third apparatus to the fourth apparatus over the second communication service upon receiving the connection request from the first apparatus and the setup information; and the fourth apparatus including a communication unit configured to communicate with the second apparatus via short-range communication, and to communicate with the third apparatus via the second communication service, and a setup information sending unit configured to send the setup information to the second apparatus in response to the request for obtaining the setup information from the second apparatus.

8. The communication system according to claim 7, wherein the first and the third apparatuses each include an apparatus detecting unit configured to detect each other as a communication destination via short-range communication to enable communication between the first and the third apparatuses, and the second and the fourth apparatuses each include an apparatus detecting unit configured to detect each other as a communication destination via short-range communication to enable communication between the second and the fourth communication apparatuses.

9. The communication system according to claim 8, wherein, the communication units of the first and the third apparatuses are configured to communicate with each other via an identical network or the short-range communication when the first and the second communication services are provided over the identical network.

10. The communication system according to claim 8, wherein, the communication units of the second and the fourth apparatuses are configured to communicate with each other using at least one of an identical network or the short-range communication when the first and the second communication services are provided over the identical network.

11. The communication system according to claim 7, wherein the setup information includes address information regarding the fourth apparatus used to connect with the second communication service.

12. The communication system according to claim 7, wherein either the first and the second apparatuses or the third and the fourth apparatuses are portable.

13. A communication system including a first and a second apparatuses capable of communicating with each other over a plurality of communication services, the communication system comprising:
the first apparatus including
a communication unit configured to communicate over a first communication service and a second communication service,
a setup information obtaining unit configured to obtain setup information to enable an external apparatus over the second communication service, and
a connection request unit configured to send a connection request accompanied by the setup information to the second apparatus via the first communication service; and
the second apparatus including
a communication unit configured to communicate over the first communication service and the second communication service, and
a connection requesting unit configured to receive the connection request accompanied by the setup information, from the first apparatus, to connect the first apparatus over the second communication service using the setup information.

14. A communication system including a first and a second apparatuses capable of communicating with each other over a plurality of communication services, the communication system comprising:
the first apparatus including
a communication unit configured to communicate over a first communication service and a second communication service,
a setup information requesting unit configured to request the second apparatus to provide setup information to enable the first apparatus to connect to the second apparatus over the second communication service, and
a connection requesting unit configured to receive a connection request accompanied by the setup information, from the second apparatus, to connect to the second apparatus over the second communication service using the setup information; and
the second apparatus including
a communication unit configured to communicate over the first communication service and the second communication service,
a setup information obtaining unit configured to obtain the setup information upon receipt of the request for the setup information from the first apparatus, and
a setup information sending unit configured to send the obtained setup information to the first apparatus via the first communication service.

15. A method for switching a communication service in a communication system including a first and a second apparatuses communicating with each other over a first communication service, and a third and a fourth apparatuses communicating with each other over a second communication service, the method comprising:
obtaining setup information from the third apparatus via a short-range communication between the first and the third apparatuses, to connect to the third apparatus over the second communication service;
sending a connection request accompanied by the obtained setup information to the second apparatus over the first communication service to enable the fourth apparatus to connect to the third apparatus over the second communication service,
sending a connection request accompanied by the setup information received from the first apparatus, to the fourth apparatus via short-range communication between the second and the fourth apparatuses to connect the fourth apparatus to the third apparatus over the second communication service using the setup information; and
connecting the fourth apparatus to the third apparatus over the second communication service using the received setup information, when the fourth apparatus receives the connection request from the second apparatus.

16. A method for switching a communication service in a communication system including a first and a second apparatuses communicating with each other over a first communication service, and a third and a fourth apparatuses communicating with each other over a second communication service, the method comprising:
requesting the second apparatus to provide setup information to connect to the fourth apparatus over the second communication service;
obtaining the setup information via short-range communication between the second and the fourth apparatuses, in response to the request for the setup information from the first apparatus;
sending the obtained setup information to the first apparatus over the first communication service;
sending a connection request accompanied by the setup information to the third apparatus via short-range communication between the first and the third apparatuses, to enable the third apparatus to connect to the fourth apparatus over the second communication service; and
connecting the third apparatus to the fourth apparatus over the second communication service using the received setup information, when the third apparatus receives the connection request from the first apparatus.

* * * * *